United States Patent
Kwack et al.

(10) Patent No.: US 8,685,475 B2
(45) Date of Patent: Apr. 1, 2014

(54) **METHOD FOR MANUFACTURING FERMENTED TEA USING *BACILLUS* SP. STRAINS**

(75) Inventors: Il Young Kwack, Seoul (KR); Bum Jin Lee, Seoul (KR); Yu Jin Oh, Seongnam-si (KR); Jin Oh Chung, Seongnam-si (KR); Tae Ryong Lee, Yongin-si (KR); Kyung Hee Suh, Seoul (KR); Han Kon Kim, Suwon-si (KR)

(73) Assignee: Amorepacific Corporation, Seoul (KR)

( * ) Notice: Subject to any disclaimer, the term of this patent is extended or adjusted under 35 U.S.C. 154(b) by 230 days.

(21) Appl. No.: 13/129,991

(22) PCT Filed: Nov. 25, 2009

(86) PCT No.: PCT/KR2009/006979
§ 371 (c)(1),
(2), (4) Date: May 18, 2011

(87) PCT Pub. No.: WO2010/062106
PCT Pub. Date: Jun. 3, 2010

(65) Prior Publication Data
US 2011/0250315 A1  Oct. 13, 2011

(30) Foreign Application Priority Data
Nov. 25, 2008 (KR) .................. 10-2008-0117642

(51) Int. Cl.
*A23F 3/10* (2006.01)
(52) U.S. Cl.
USPC .......................................................... 426/52
(58) Field of Classification Search
USPC .......................................................... 426/52
See application file for complete search history.

(56) References Cited

FOREIGN PATENT DOCUMENTS

| | | |
|---|---|---|
| JP | 10-191930 A | 7/1998 |
| JP | 2876006 B1 | 1/1999 |
| JP | 2007-044014 A | 2/2007 |
| KR | 10-2001-0103256 A | 11/2001 |
| KR | 10-2007-0105381 A | 10/2007 |
| KR | 10-0884185 B1 | 6/2008 |
| KR | 10-0844185 B1 | 7/2008 |

OTHER PUBLICATIONS

Ramarethinam, S. et al. 2004. Caffeine in tea plants. In situ lowering by *Bacillus licheniformis*. Indian J. of Experimental Biology. 42: 575-580.*

Kim, Y. et al. 2004. Identification and antimicrobial activity of phenylacetic acid produced by *Bacillus licheniformis* isotated from fermented soybean, Chungkook-Jang. Current Microbiology. 48: 312-317.*

Form PCT/ISA/210 for corresponding International Application PCT/KR2009/006979.

Form PCT/ISA/237 for corresponding International Application PCT/KR2009/006979.

Du et al., "Research for physiology and culturing character of *Bacillus subtilis*" GuangZhou Feed, vol. 17, the 4th, pp. 26-27 (2008).

Office Action for Japanese Patent Application No. 2011-537374 (mailed Jul. 18, 2013).

Office Action for Chinese Patent Application No. 200980147120.1 (mailed Jul. 11, 2013).

* cited by examiner

*Primary Examiner* — D. Lawrence Tarazano
*Assistant Examiner* — Hamid R Badr
(74) *Attorney, Agent, or Firm* — Merchant & Gould P.C.

(57) ABSTRACT

Disclosed is a method for manufacturing fermented tea having superior flavor using *Bacillus* sp. strains isolated from Korean traditional fermented foods.

11 Claims, No Drawings

METHOD FOR MANUFACTURING FERMENTED TEA USING *BACILLUS* SP. STRAINS

This application is a National Stage Application of PCT/KR2009/006979, filed 25 Nov. 2009, which claims benefit of Ser. No. 10-2008-0117642, filed 25 Nov. 2008 in the Republic of Korea and which applications are incorporated herein by reference. To the extent appropriate, a claim of priority is made to each of the above disclosed applications.

TECHNICAL FIELD

The present disclosure relates to a method for manufacturing fermented tea with improved flavor without contamination by pathogens or other microbes.

BACKGROUND ART

In general, as tea is fermented by microorganisms, its taste, scent and color are changed due to the metabolism by the microorganisms, leading to change in flavor. That is to say, as the carbohydrates, proteins, catechins and minerals of the tea are metabolized by the characteristic enzymes of the microorganisms, the composition of organic acids, polyphenols, etc. of the tea is changed, thereby resulting in change of taste, scent and color. The change of the flavor of the tea upon fermentation depends on the related microorganism, contents of the tea ingredients, composition of the protein-free fermentation broth, fermentation temperature, fermentation time, or the like.

Thus, in order to produce good fermented tea, selection of adequate microorganisms, composition of the protein-free fermentation broth, determination of the fermentation temperature and time, or the like are important. In general, fermented tea is obtained by leaving heat-treated tea leaves alone in a container. Thus, the fermentation is affected by airborne microbes or unspecified anaerobes or other microbes, especially fungi, attached to the tea leaves. Specifically, toxins produced by pathogenic microorganisms such as *Escherichia coli*, *Staphylococcus aureus*, *Pseudomonas aeruginosa*, etc. and toxins produced by fungi, e.g. aflatoxin, may be hazardous. Furthermore, it is difficult to provide tea with reproducible taste because the kind and quantity of the microorganisms cannot be controlled.

DISCLOSURE

Technical Problem

The present disclosure is directed to providing a fermented tea having superior flavor and being safe from pathogens, which is prepared by fermenting green tea using microorganisms isolated from Korean traditional fermented foods including soy sauce, soybean paste, jeotgal (fermented fish), baechu (napa cabbage) kimchi, radish kimchi, watery kimchi, or the like.

Technical Solution

In one general aspect, the present disclosure provides a method for manufacturing fermented tea, including: (i) preparing *Bacillus* sp. strains; (ii) stabilizing the *Bacillus* sp. strains; and (iii) fermenting tea leaves by treating with the stabilized *Bacillus* sp. strains.

The *Bacillus* sp. strains may be selected from a group consisting of *Bacillus licheniformis*, *Bacillus pumilus*, *Bacillus sonorensis* and *Bacillus subtilis*.

Other features and aspects will be apparent from the following detailed description and the claims.

Advantageous Effects

The present disclosure allows manufacturing of a fermented tea having superior flavor and improved preference with the astringent and bitter taste relieved and being safe from pathogens or other undesirable microbes.

MODE FOR INVENTION

As used herein, "protein-free fermentation broth" refers to a mixture of strains for fermentation with a culture medium which does not contain protein powder.

As used herein, "protein-containing fermentation broth" refers to a mixture of strains for fermentation with a culture medium which contains protein powder.

As used herein, "*Bacillus* strains isolated from fermented food" refers to the *Bacillus* strains isolated from fermented food such as soy sauce, soybean paste, jeotgal (fermented fish), baechu (napa cabbage) kimchi, etc. Especially, the fermented food may be Korean traditional fermented food.

The present disclosure provides a method for manufacturing fermented tea, comprising: (i) preparing *Bacillus* sp. strains; (ii) stabilizing the *Bacillus* sp. strains; and (iii) fermenting tea leaves by treating with the stabilized *Bacillus* sp. strains.

In an embodiment of the present disclosure, the *Bacillus* sp. strains may be selected from a group consisting of *Bacillus licheniformis* F1017, *Bacillus licheniformis* F1232, *Bacillus licheniformis* F1267, *Bacillus licheniformis* F1268, *Bacillus licheniformis* F1200, *Bacillus pumilus* F1337, *Bacillus sonorensis* F1005, *Bacillus subtilis* F1004, *Bacillus subtilis* F1236 and *Bacillus subtilis* F1279. Specifically, *Bacillus licheniformis* F1017 may be used in the aspect of taste. The strains are deposited in the Korea Food Research Institute (KFRI) and may be easily acquired from the KFRI.

In an embodiment of the present disclosure, in the step (i), after centrifuging a culture medium including the *Bacillus* sp. strains, it may be washed with brine to remove the culture medium. The culture medium may be completely removed since it may affect the flavor of the tea. In the case where the *Bacillus* sp. strains are lyophilized into powder form, the step of centrifuging the culture medium including the *Bacillus* sp. strains and washing it with brine may be omitted, and the step (ii) of stabilizing the *Bacillus* sp. strains may proceed immediately.

In another embodiment of the present disclosure, in the step (ii), the *Bacillus* sp. strains may be stabilized by culturing the *Bacillus* sp. strains in a sterilized protein-free fermentation broth not containing protein powder.

Specifically, the protein-free fermentation broth not containing protein powder may contain sugar, fructose and water. The reason why protein powder is not added during the stabilization of the strains is to avoid foul odor resulting from decomposition by the microorganisms.

The manufacturing method according to the present disclosure may further comprise adding protein powder to the culture medium containing the stabilized *Bacillus* sp. strains, before the step (iii). By adding the protein powder to the culture medium containing the stabilized *Bacillus* sp. strains rather than adding it during the stabilization of the strains, fermented tea with superior flavor may be prepared.

The protein powder refers to protein prepared into powder form. Any protein ingredients may be used. For example, animal protein powder or plant protein powder may be used. Examples of the animal protein powder may include beef powder, milk protein powder, etc. Plant protein powder may be preferred in terms of safety, since beef powder is associated with the risk of, for example, mad cow disease.

The plant protein powder may be soybean powder. The soybean powder refers to powdered soybean. Examples of the soybean powder may include soybean protein powder, soybean lecithin powder, soybean peptide powder, etc.

In the step (iii), the tea leaves may be fermented by treating with a protein-containing fermentation broth obtained by adding the protein powder to the culture medium containing the stabilized *Bacillus* sp. strains.

In an embodiment, the protein-containing fermentation broth may comprise 0.05-10.0 wt % of sugar, 0.005-10.0 wt % of fructose and 0.005-1.0 wt % of protein powder based on the total weight of the protein-containing fermentation broth. Within the above range, fermentation by the strains may occur optimally.

In an embodiment, the tea leaves may be fermented by treating with the protein-containing fermentation broth 3 to 5 times with time intervals. If it is mixed at once with the green tea leaves, it is not easy to accomplish uniform mixing with the protein-containing fermentation broth. When adding the protein-containing fermentation broth to the tea leaves, the tea leaves may be agitated continuously. It is to prevent the strains from being damaged by rapid temperature increase resulting when the dry green tea leaves are contacted with water.

The tea leaves treated with the protein-containing fermentation broth may be raw green tea leaves or dried green tea leaves. Fermentation is possible even with the dried leaves. Use of the dried leaves may be desirable in that the stock of dried green tea can be utilized.

In an embodiment of the present disclosure, the protein-containing fermentation broth in the step (iii) may comprise $10^3$-$10^8$ CFU/mL of the *Bacillus* sp. strains. When the strains are included within the range, fermentation may occur efficiently.

In an embodiment of the present disclosure, the step (iii) may be carried out at a temperature adequate to prepare fermented tea with good flavor, without particular limitation. For example, it may be performed at 15 to 70° C., specifically 40 to 70° C. The fermentation at 15 to 40° C. may be, for example, low temperature fermentation. In this case, treatment with, for example, an organic acid may inhibit proliferation of undesired microbes.

At temperatures above 40° C., the proliferation of undesired microbes may be inhibited without any additive, without harming the characteristic flavor of the tea. If the fermentation temperature is above 40° C., microbes other than the *Bacillus* sp. strains do not grow well. For growth of the *Bacillus* sp. strains, the temperature may be not greater than 70° C.

Hereinafter, each step of the method for manufacturing fermented tea according to the present disclosure will be described.

<Preparation of Green Tea Leaves and Strains>

Dried green tea leaves are prepared as main substrate through an aseptic process. Strains isolated from Korean traditional fermentation foods as described in Table 1 are inoculated into an activated culture medium for activating the strains held in an Erlenmeyer flask (e.g., 1000 mL), and cultured in a shaking incubator at 20-40° C. for 60-80 hours.

TABLE 1

| | Strain | Strain ID | Source |
|---|---|---|---|
| Ex. 1 | *Bacillus licheniformis* | F1017 | Fermented soybean lump |
| Ex. 2 | *Bacillus licheniformis* | F1232 | Soy sauce |
| Ex. 3 | *Bacillus licheniformis* | F1267 | Red pepper paste |
| Ex. 4 | *Bacillus licheniformis* | F1268 | Red pepper paste |
| Ex. 5 | *Bacillus licheniformis* | F1200 | Soybean paste |
| Ex. 6 | *Bacillus pumilus* | F1337 | Soybean paste |
| Ex. 7 | *Bacillus sonorensis* | F1005 | Fermented soybean lump |
| Ex. 8 | *Bacillus subtilis* | F1004 | Fermented soybean lump |
| Ex. 9 | *Bacillus subtilis* | F1236 | Soy sauce |
| Ex. 10 | *Bacillus subtilis* | F1279 | Red pepper paste |

<Preparation of Strains>

The strains cultured for 60-80 hours in the shaking incubator are collected and centrifuged to separate the strains from the activated culture medium. The centrifugation is performed at 2000-4500 rpm for 5-10 minutes, and the supernatant, i.e. the activated culture medium is removed from the separated sample using a vacuum aspirator. Since the residual activated culture medium may affect the flavor of the green tea during fermentation, the strains are washed 2-4 times using 0.8-1.0% physiological saline. That is, after adding physiological saline to the strain precipitate with the activated culture medium removed, the resultant is mixed well for 0.5-1 minute using an electric stirrer, so that the strain precipitate is dispersed well in the physiological saline. The resulting physiological saline solution with the strains dispersed is centrifuged at 2000-4500 rpm for 5-10 minutes, and the physiological saline is removed using a vacuum aspirator. This procedure is repeated 2-4 times to completely remove the activated culture medium.

<Preparation of Protein-Free Fermentation Broth and Stabilization of Strains>

For adequate metabolism by the microorganisms, supply of water and energy source is required in addition to the green tea. Food additives as energy source may be sugars, proteins, etc. The taste of the fermented tea depends on the kind and content of the additive. Specifically, the protein-free fermentation broth is prepared by mixing 0.05-10.0% of sugar, 0.005-10.0% of fructose and 0.005-1.0% of protein powder. Specifically, after dissolving 0.05-10.0% of sugar and 0.005-10.0% of fructose in purified water, the resultant is sterilized under pressure at 100-140° C. for 10-20 minutes. The sterilized protein-free fermentation broth is cooled to room temperature and then mixed with 0.005-1.0% of protein powder.

For effective fermentation metabolism by the strains, which may have been damaged during the washing process, it is necessary to stabilize the strains in the protein-free fermentation broth. For this, before adding the protein powder, the protein-free fermentation broth (100-500 mL) is mixed with the strains that have been washed with physiological saline for 2-4 times, and the strains are stabilized by culturing in an incubator at 20-40° C. for 12-36 hours.

<Fermentation and Drying of Green Tea>

Protein powder is added to the strains stabilized in the protein-free fermentation broth to prepare the protein-containing fermentation broth. In a sterilized reaction tank, the main substrate green tea prepared in small packaging units is mixed with the protein-containing fermentation broth. The number of the strains in the protein-containing fermentation broth mixture is controlled to $10^3$-$10^8$ CFU/mL. When water content is larger than 60% based on the weight of the dried green tea leaves (water content <5%), the fermented tea reddens, its taste worsens, and processing may be difficult because the green tea leaves are adhered to each other. And, when the water content is smaller than 30%, fermentation of the green tea leaves by the strains may be nonuniform. Accordingly, the protein-free fermentation broth may be mixed in an amount of 30-60% based on the weight of the dried green tea leaves. If the protein-containing fermentation broth is mixed at once with the green tea leaves, it is not easy to accomplish uniform mixing with the protein-containing fermentation broth. Thus, the protein-free fermentation broth is mixed with the green tea leaves by 20-30% of the total amount for 3-5 times. When water is added to the dried green tea leaves, an exothermic reaction occurs. Therefore, the tea leaves may be agitated continuously after adding the protein-containing fermentation broth to the tea leaves in order to prevent the strains from being damaged by rapid temperature increase. Upon completion of the exothermic reaction 5-30 minutes later, the cooled protein-containing fermentation broth mixture is fermented in a constant-temperature fermentation tank at 20-70° C. shut off from the external air. If the fermentation temperature is above 40° C., the proliferation of microbes except for *Bacillus* may be inhibited. Thus, the proliferation of undesired microbes during the aging may be prevented. The fermentation is carried out for at least 24 hours up to 28 days. Then, the resultant is hot-air dried at 80-120° C. for 3-7 hours.

The fermented green tea prepared according to the present disclosure contains not more than $10^2$-$10^8$ CFU/g of total microbes in the final product. No pathogenic microorganism is detected.

EXAMPLES

The examples and experiments will now be described. The following examples and experiments are for illustrative purposes only and not intended to limit the scope of this disclosure.

Fermented green tea was prepared as follows.

Examples 1-10

Preparation of Fermented Tea

<Preparation of Green Tea Leaves and Strains>

Dried green tea leaves were prepared as main substrate through an aseptic process. Strains isolated from Korean traditional fermentation foods as described in Table 1 were inoculated into an activated culture medium for activating the strains [Difco™ potato dextrose broth (containing 0.4% potato starch and 2% dextrose per 100 mL of the medium)] held in an Erlenmeyer flask (1000 mL), and cultured in a shaking incubator at 25° C. for 72 hours.

The strains were acquired from the Korea Food Research Institute (KFRI). They were *Bacillus licheniformis* F1017 (Example 1), *Bacillus licheniformis* F1232 (Example 2), *Bacillus licheniformis* F1267 (Example 3), *Bacillus licheniformis* F1268 (Example 4), *Bacillus licheniformis* F1200 (Example 5), *Bacillus pumilus* F1337 (Example 6), *Bacillus sonorensis* F1005 (Example 7), *Bacillus subtilis* F1004 (Example 8), *Bacillus subtilis* F1236 (Example 9) and *Bacillus subtilis* F1279 (Example 10) isolated from soybean paste, red pepper paste, soy sauce or fermented soybean lump.

<Preparation of Strains>

The strains cultured for 72 hours in the shaking incubator were collected and centrifuged at 3000 rpm for 10 minutes to separate the strains from the activated culture medium. The supernatant, i.e. the activated culture medium was removed from the separated sample using a vacuum aspirator. Since the residual activated culture medium may affect the flavor of the green tea during fermentation, the strains were washed 4 times using 0.9% physiological saline. That is, after adding physiological saline to the strain precipitate with the activated culture medium Removed, the resultant was mixed well for 1 minute using an electric stirrer, so that the strain precipitate was dispersed well in the physiological saline. The resulting physiological saline solution with the strains dispersed was centrifuged at 3000 rpm for 10 minutes, and the physiological saline was removed using a using a vacuum aspirator. This procedure was repeated 4 times to completely remove the activated culture medium. Alternatively, the strains were also prepared as follows. After inoculating the strains into an activated culture medium for activating the strains (Difco™ potato dextrose broth), the strains were cultured for 72 hours. The strains were then collected and centrifuged at 3000 rpm for 10 minutes to separate the strains from the activated culture medium. Then, the separated strains were mixed with maltodextrin, 9 times the weight of the separated strains. The resulting paste was dried by spray drying and prepared into powder. Then, the number of microorganisms in the powder was counted.

<Preparation of Protein-Free Fermentation Broth and Stabilization of Strains>

The strains were stabilized in a protein-free fermentation broth containing 5.0 wt % of sugar and 5.0 wt % of fructose based on the total weight of the protein-free fermentation broth. Specifically, after dissolving 5.0 wt % of sugar and 5.0 wt % of fructose in purified water, the resultant was sterilized under pressure at 120° C. for 15 minutes. The sterilized protein-free fermentation broth was cooled to 25° C. After adding the strains to the cooled protein-free fermentation broth (250 mL), the strains were cultured in an incubator for 24 hours.

<Fermentation and Drying of Green Tea>

1.0 wt % of soybean protein powder (Kimoon) was added to the protein-free fermentation broth to prepare a protein-containing fermentation broth. In a sterilized reaction tank, the main substrate green tea prepared in small packaging units was mixed with the protein-containing fermentation broth. The number of the strains in the protein-containing fermentation broth mixture was $10^6$ CFU/mL. The protein-free fermentation broth was mixed in an amount of 50% based on the weight of the dried green tea leaves. The protein-free fermentation broth was mixed with the green tea leaves by 20% of the total amount for 5 times with time intervals. The tea leaves were agitated continuously after adding the protein-containing fermentation broth to the tea leaves in order to prevent the strains from being damaged by rapid temperature increase. Upon completion of the exothermic reaction 20 minutes later, the cooled protein-containing fermentation broth mixture was fermented in a constant-temperature fermentation tank at 50° C. shut off from the external air. The fermentation was carried out for 10 days. Then, the resultant was hot-air dried at 100° C. for 5 hours.

The prepared fermented green tea contained not more than $10^2$-$10^8$ CFU/g of total microbes in the final product.

Test Example 1

Contamination by Microorganisms

The number of total microbes and specific pathogens contained in the fermented tea prepared in Examples 1-10 was counted. The result is given in Table 2.

TABLE 2

| | Strain | Source | Total microbes (CFU/g*) Bacteria | Total microbes (CFU/g*) Fungi | Specific pathogens Escherichia coli | Specific pathogens Staphylococcus aureus | Specific pathogens Pseudomonas aeruginosa |
|---|---|---|---|---|---|---|---|
| Ex. 1 | Bacillus licheniformis F1017 | Fermented soybean lump | <1000 | <100 | negative | negative | negative |
| Ex. 2 | Bacillus licheniformis F1232 | Soy sauce | <1000 | <100 | negative | negative | negative |
| Ex. 3 | Bacillus licheniformis F1267 | Red pepper paste | <1000 | <100 | negative | negative | negative |
| Ex. 4 | Bacillus licheniformis F1268 | Red pepper paste | <1000 | <100 | negative | negative | negative |
| Ex. 5 | Bacillus licheniformis F1200 | Soybean paste | <1000 | <100 | negative | negative | negative |
| Ex. 6 | Bacillus pumilus F1337 | Soybean paste | <1000 | <100 | negative | negative | negative |
| Ex. 7 | Bacillus sonorensis F1005 | Fermented soybean lump | <1000 | <100 | negative | negative | negative |
| Ex. 8 | Bacillus subtilis F1004 | Fermented soybean lump | <1000 | <100 | negative | negative | negative |
| Ex. 9 | Bacillus subtilis F1236 | Soy sauce | <1000 | <100 | negative | negative | negative |
| Ex. 10 | Bacillus subtilis F1279 | Red pepper paste | <1000 | <100 | negative | negative | negative |

*CFU/g: Colony-forming unit/g, number of microbes per gram of green tea

Test Example 2

Sensory Test

A panel test was carried out to investigate the taste, scent and color of the fermented green tea prepared in Examples 1-10 depending on the associated strains. 10 experts were asked to select their favorite samples from the 10 fermented green tea prepared in Examples 1-10 through multi-voting. The test result is as follows.

TABLE 3

| | Strain | Source | Panel No. 1 | 2 | 3 | 4 | 5 | 6 | 7 | 8 | 9 | 10 | Score |
|---|---|---|---|---|---|---|---|---|---|---|---|---|---|
| Ex. 1 | Bacillus licheniformis F1017 | Fermented soybean lump | 1 | 1 | | 1 | 1 | | 1 | 1 | | 1 | 7 |
| Ex. 2 | Bacillus licheniformis F1232 | Soy sauce | 1 | | | | | | | | | 1 | 2 |
| Ex. 3 | Bacillus licheniformis F1267 | Red pepper paste | 1 | | | | | | | 1 | | | 2 |
| Ex. 4 | Bacillus licheniformis F1268 | Red pepper paste | | | | 1 | | | | | | | 1 |
| Ex. 5 | Bacillus licheniformis F1200 | Soybean paste | | | | | | 1 | | | | | 1 |
| Ex. 6 | Bacillus pumilus F1337 | Soybean paste | | 1 | 1 | | | 1 | | 1 | | | 4 |
| Ex. 7 | Bacillus sonorensis F1005 | Fermented soybean lump | 1 | 1 | | 1 | | | | | | | 3 |
| Ex. 8 | Bacillus subtilis F1004 | Fermented soybean lump | 1 | 1 | 1 | | | | | | | | 3 |
| Ex. 9 | Bacillus subtilis F1236 | Soy sauce | | | | | | | | | | | 0 |
| Ex. 10 | Bacillus subtilis F1279 | Red pepper paste | | | | | | | | | | | 0 |

What is claimed is:
1. A method for manufacturing fermented tea, comprising:
preparing *Bacillus* sp. strains;
culturing the *Bacillus* sp. strains in a sterilized protein-free fermentation broth not containing protein powder, wherein the protein-free fermentation broth comprises sucrose, fructose and water;
adding protein powder to the culture medium containing the cultured *Bacillus* sp. strains; and
fermenting tea leaves in the culture medium containing the protein powder and the cultured *Bacillus* sp. strains.

2. The method for manufacturing fermented tea according to claim 1, wherein the *Bacillus* sp. strains are isolated from fermented food.

3. The method for manufacturing fermented tea according to claim 1, wherein the *Bacillus* sp. strains are selected from a group consisting of *Bacillus licheniformis, Bacillus pumilus, Bacillus sonorensis* and *Bacillus subtilis*.

4. The method for manufacturing fermented tea according to claim 1, wherein said preparing the *Bacillus* sp. strains comprises centrifuging a culture medium containing the *Bacillus* sp. strains and washing it with brine to remove the culture medium.

5. The method for manufacturing fermented tea according to claim 1, wherein the protein-free fermentation broth comprises sucrose, fructose and water.

6. The method for manufacturing fermented tea according to claim 1, wherein the culture medium containing the protein powder comprises 0.05-10.0 wt % of sucrose, 0.005-10.0 wt % of fructose and 0.005-1.0 wt % of protein powder based on the total weight of the culture medium containing the protein powder.

7. The method for manufacturing fermented tea according to claim 1, wherein the protein powder is soybean powder.

8. The method for manufacturing fermented tea according to claim 1, wherein said fermenting the tea leaves comprises treating the tea leaves with the culture medium containing the protein powder 3 to 5 times with time intervals.

9. The method for manufacturing fermented tea according to claim 1, wherein the tea leaves are agitated during or after fermenting in the culture medium containing the protein powder.

10. The method for manufacturing fermented tea according to claim 1, wherein the culture medium containing the protein powder comprises $10^3$-$10^8$ CFU/mL of the *Bacillus* sp. strains.

11. The method for manufacturing fermented tea according to claim 1, wherein said fermenting the tea leaves is performed at 40 to 70° C.

* * * * *